(12) United States Patent
Chen et al.

(10) Patent No.: US 9,613,427 B2
(45) Date of Patent: Apr. 4, 2017

(54) INFORMATION PROCESSING METHOD AND ELECTRONIC DEVICE

(71) Applicants: Beijing Lenovo Software Ltd., Beijing (CN); Lenovo (Beijing) Limited, Beijing (CN)

(72) Inventors: Chen Chen, Beijing (CN); Shoupeng Zhang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 70 days.

(21) Appl. No.: 14/661,394

(22) Filed: Mar. 18, 2015

(65) Prior Publication Data
US 2016/0125614 A1 May 5, 2016

(30) Foreign Application Priority Data

Nov. 3, 2014 (CN) .......................... 2014 1 0610640
Nov. 3, 2014 (CN) .......................... 2014 1 0610702

(51) Int. Cl.
*G06T 7/13* (2017.01)
*G06T 7/00* (2017.01)
*G06T 3/00* (2006.01)

(52) U.S. Cl.
CPC .......... *G06T 7/0085* (2013.01); *G06T 3/0012* (2013.01); *G06T 7/13* (2017.01); *G06T 2207/20021* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 6,556,721 B1* | 4/2003 | Wang | G06T 7/0081 382/282 |
| 9,330,334 B2* | 5/2016 | Lin | G06K 9/4671 |
| 2006/0077266 A1* | 4/2006 | Nurmi | H04M 1/72563 348/239 |
| 2009/0297031 A1* | 12/2009 | Pettigrew | G06K 9/342 382/195 |
| 2010/0329550 A1* | 12/2010 | Cheatle | G06T 11/60 382/165 |
| 2011/0148917 A1* | 6/2011 | Alberth, Jr. | G09G 5/14 345/629 |
| 2011/0242277 A1* | 10/2011 | Do | H04N 5/272 348/43 |

(Continued)

*Primary Examiner* — Ryan M Gray
(74) *Attorney, Agent, or Firm* — Schwegman Lundberg & Woessner, P.A.

(57) ABSTRACT

The disclosure provides an information processing method applied to an electronic device. The method comprises: performing edge detection on a first image to obtain edge strength values for respective pixels of the first image; determining, according to the edge strength values of the pixels, a main information region of the first image; cropping, according to the main information region, the first image to obtain a second image which includes the main information region; and setting the second image as a background image for a graphical interactive interface of the electronic device, wherein the graphical interactive interface includes N controls, N being a positive integer.

16 Claims, 10 Drawing Sheets

(56) References Cited

U.S. PATENT DOCUMENTS

| | | | | |
|---|---|---|---|---|
| 2012/0075440 A1* | 3/2012 | Ahuja | ............... | G06T 7/0081 |
| | | | | 348/61 |
| 2012/0155756 A1* | 6/2012 | Hwang | ............... | G06T 7/0081 |
| | | | | 382/164 |
| 2013/0249939 A1* | 9/2013 | Schiel | ............... | G09G 5/00 |
| | | | | 345/629 |
| 2014/0368669 A1* | 12/2014 | Talvala | ............... | G06T 7/0081 |
| | | | | 348/207.1 |

* cited by examiner

INFORMATION PROCESSING METHOD AND ELECTRONIC DEVICE

PRIORITY APPLICATIONS

This application claims the benefit under 35 U.S.C. 119 to Chinese Application No. 201410610640.4, filed on 3 Nov. 2014, and claims the benefit under 35 U.S.C. 119 to Chinese Application No. 201410610702.1, filed on 3 Nov. 2014; which applications are incorporated herein by reference in their entirety.

TECHNICAL FIELD

The disclosure generally relates to the field of electronic technology, and particularly to an information processing method and an electronic device.

BACKGROUND

With the continuing development of science and technology, visual electronic devices become more and more advanced. Various contents can be displayed on screens of the electronic devices. Optimized displaying of Graphical User Interface (GUI) on electronic devices has always been a research hotspot.

SUMMARY

A first aspect of the disclosure provides an information processing method, comprising:
    displaying a first image;
    performing edge detection on the first image to obtain edge strength values for respective pixels of the first image;
    determining, according to the edge strength values of the pixels, at least one main information region of the first image;
    performing an operation on the first image according to the main information region.
    Optionally, prior to performing the edge detection on the first image to obtain the edge strength values for the respective pixels of the first image, at least one of a compression process, a grayscaling process and a filtering and smoothing process may be performed on the first image.
    Optionally, the operation may comprise: determining, according to the at least one main information region, a position on the first image for displaying an interactive object at the position.
    Optionally, the determining, according to the edge strength values of the pixels, the at least one main information region may comprise:
    acquiring grid matrix information of the first image;
    determining, based on the grid matrix information, a grid-based search window;
    obtaining at least one region of the first image, which has an amount of information greater than a first threshold, as the at least one main information region, by searching through the first image using the grid-based search window.
    Optionally, the obtaining at least one region of the first image, which has an amount of information greater than the first threshold, as the at least one main information region may comprise:
    calculating a sum of edge strength values of pixels within the grid-based search window to obtain a first calculation result, which characterizes an information amount of an image region framed by the grid-based search window;
    determining at least one image region, for which the first calculation result is greater than the first threshold, as the at least one main information region.
    Optionally, the obtaining at least one region of the first image, which has an amount of information greater than the first threshold, as the at least one main information region may comprise:
    calculating a sum of edge strength values of pixels within the grid-based search window to obtain a first calculation result, which characterizes an information amount of an image region framed by the grid-based search window;
    determining an image region with the maximum first calculation result as the main information region.
    Optionally, the performing an operation on the first image according to the at least one main information region may comprise:
    cropping, according to the main information region, the first image to obtain a second image, which includes the main information region;
    setting the second image as a background image for a graphic interactive interface of an electronic device, and displaying an interactive object on the at least one main information region.
    Optionally, the cropping, according to the main information region, the first image to obtain the second image may comprise:
    dividing the first image into M sub-images, wherein the M sub-images are respectively used as background images for M screens corresponding to the graphic interactive interface, and one of the M sub-images which includes the main information region is used as a background image for a first screen among the M screens, wherein M is an integer larger than or equal to 2.
    Optionally, the performing an operation on the first image according to the at least one main information region may comprise:
    displaying an interactive object on a region of the first image other than the at least one main information region, wherein the region of the first image other than the at least one main information region has a less amount of information than the at least one main information region.

A second aspect of the disclosure provides an electronic device, comprising:
    a displaying unit configured to display an image;
    a detecting unit configured to perform edge detection on a first image displayed on the displaying unit to obtain edge strength values for respective pixels of the first image;
    a processing unit configured to determine, according to the edge strength values of the pixels, at least one main information region of the first image;
    an operation performing unit configured to perform an operation on the first image according to the main information region.
    Optionally, the processing unit may be further configured to, prior to performing edge detection on the first image to obtain the edge strength values for the respective pixels in the first image, perform on the first image at least one of a compression process, a grayscaling process and a filtering and smoothing process.
    Optionally, the operation may comprise: determining, according to the at least one main information region, a position on the first image for displaying an interactive object at the position.

Optionally, the processing unit may be further configured to:

acquire grid matrix information of the first image;

determine, based on the grid matrix information, a grid-based search window;

obtain at least one region of the first image, which has an amount of information greater than a first threshold, as the at least one main information region, by searching through the first image using the grid-based search window.

Optionally, the processing unit may be further configured to:

calculate a sum of edge strength values of pixels within the grid-based search window to obtain a first calculation result, which characterizes an information amount of an image region framed by the grid-based search window;

determine at least one image region, for which the first calculation result is greater than the first threshold, as the at least one main information region.

Optionally, the processing unit may be further configured to:

calculate a sum of edge strength values of pixels within the grid-based search window to obtain a first calculation result, which characterizes an information amount of an image region framed by the grid-based search window;

determine an image region with the maximum first calculation result as the main information region.

Optionally, the operation performing unit may be further configured to:

crop, according to the main information region, the first image to obtain a second image, which includes the main information region;

set the second image as a background image for a graphical interactive interface of an electronic device, and display an interactive object on the at least one main information region.

Optionally, the operation performing unit may be further configured to:

divide the first image into M sub-images, wherein the M sub-images are respectively used as background images for M screens corresponding to the graphical interactive interface, and one of the M sub-images which includes the main information region is used as a background image for a first screen among the M screens, wherein M is an integer larger than or equal to 2.

Optionally, the operation performing unit may be further configured to:

display an interactive object on a region of the first image other than the at least one main information region, wherein the region of the first image other than the at least one main information region has a less amount of information than the at least one main information region.

BRIEF DESCRIPTION OF THE DRAWINGS

To better illustrate solutions of embodiments of the disclosure, drawings that will be used in the detailed description of the embodiments will be described below. Obviously, such drawings are only illustrative and those skilled in the art can derive other drawings from those provided without making creative efforts.

DETAILED DESCRIPTION OF EMBODIMENTS

The disclosure generally provides an information processing method, comprising: displaying a first image; performing edge detection on the first image to obtain edge strength values for respective pixels of the first image; determining, according to the edge strength values of the pixels, at least one main information region of the first image; performing an operation on the first image according to the main information region.

In the above solution, at least one main information region of the first image is determined according to the edge strength values for respective pixels of the first image, and an operation (including, but not limited to, operations required for automatically setting a background image and/or automatically arranging application icons) is performed on the first image according to the main information region. As such, information contents of the first image are considered when performing the operation on the first image. Accordingly, requirements for the displaying of interface can be fulfilled better and user satisfaction with the result of the operation can be improved.

To better understand the above solution, detailed description of the solution of the disclosure is provided below by referring to drawings and embodiments. It should be understood that the embodiments and specific features of the embodiments are detailed illustration of the solution of the present disclosure, rather than limitation to the solution of the present disclosure. The embodiments and technical features of the embodiments may be combined without incurring conflicts.

First Embodiment

Figure 1:
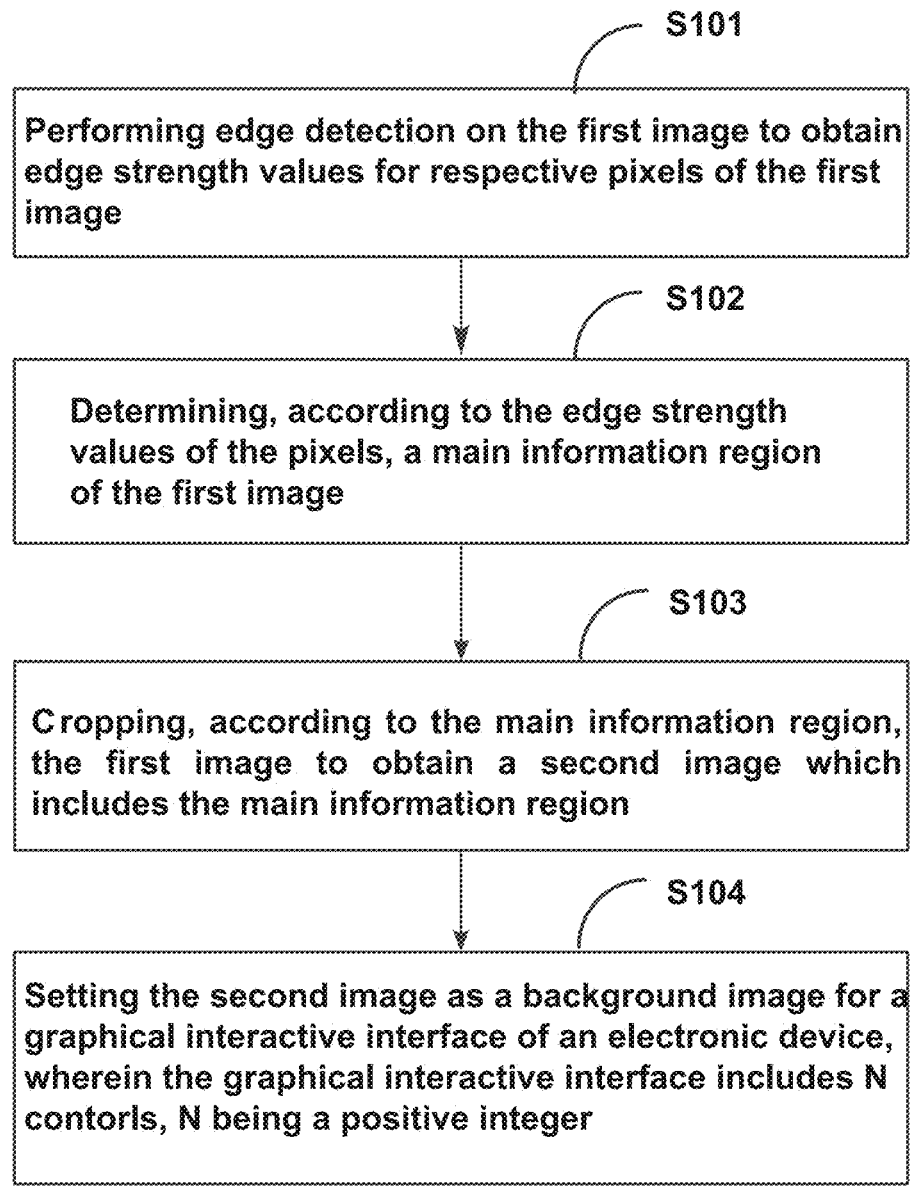
FIG. 1 shows a flowchart of an information processing method according to a first embodiment of the disclosure.

Referring to FIG. 1, this embodiment of the disclosure provides an information processing method applied to an electronic device. The method comprises:

at S101, performing edge detection on the first image to obtain edge strength values for respective pixels of the first image;

at S102, determining, according to the edge strength values of the pixels, a main information region of the first image;

at S103, cropping, according to the main information region, the first image to obtain a second image which includes the main information region;

at S104, setting the second image as a background image for a graphical interactive interface of an electronic device, wherein the graphical interactive interface includes N controls, N being a positive integer.

In detailed implementation, the electronic device may be a cellphone, a tablet computer, etc. Detailed description of how to implement the method according to the embodiment of the disclosure will be given by taking an example where the electronic device is the cellphone.

Prior to the execution of S101, the method according to the embodiment may further comprise performing, on the first image, a compression process, a grayscaling process and/or a filtering and smoothing process.

Specifically, a source wallpaper image may be set as the background image for a cellphone's screen (or a browser, etc.) In the embodiment, when the user of the cellphone wants to set the background image for the cellphone screen, he/she selects an image as the wallpaper image to be processed. Then, pre-processing, such as a compression process, a grayscaling process and a filtering and smoothing process, is performed on the wallpaper image to be processed. The compression process may be implemented by performing down-sampling, local averaging and so forth. The grayscaling process may be implemented by binarizing the image to obtain a grayscale version of the wallpaper image. By performing the filtering and smoothing process on the grayscale image, noise in the wallpaper image may be removed so as to improve signal-to-noise ratio of the wallpaper image. To this end, various approaches such as Gaussian filtering, median-value filtering and the like may be applied, as long as they can effectively remove the noise. The disclosure is not limited in this regard, and those skilled in the art may select, according to practical demands, appropriate approaches to perform the compression process, grayscaling process and filtering and smoothing process on the wallpaper image.

After a pre-processed wallpaper image is obtained as described above, step S101 is executed, where edge detection is performed on the first image to obtain edge strength values for respective pixels of the first image. Specifically, in the embodiment, important structural information of the source wallpaper image may be determined by performing the edge detection. For example, if the source wallpaper image has a red background with a yellow triangle overlaid thereon, then a boundary between the triangle and the background (i.e. the border of the triangle) may be obtained by performing edge detection on the image. By performing edge detection, each pixel of the image is provided with a corresponding edge strength value. If the edge strength values for two pixels are close, then it is considered that there is a small color discrepancy between these two pixels. If the edge strength values for two pixels differs a lot, then it is considered that there is a large color discrepancy between these two pixels, that is, a boundary exists therebetween. Thus, the edge strength value may be used as a parameter reflecting information contents of the image, and it may be obtained by applying an edge detection operator to luminance values of pixels in the image. In the embodiment, the edge detection operator may be a Laplace edge filtering operator, a Sobel edge filtering operator, a Robert edge operator, a Prewitt edge operator, a LOG edge operator or a Canny filtering operator, etc. The disclosure is not limited in this regard, and those skilled in the art may also use other operators to perform edge detection.

After the execution of step S101, the method according to the embodiment proceeds to S102, where a main information region of the first image is determined according to the edge strength values of the pixels.

Figure 2:
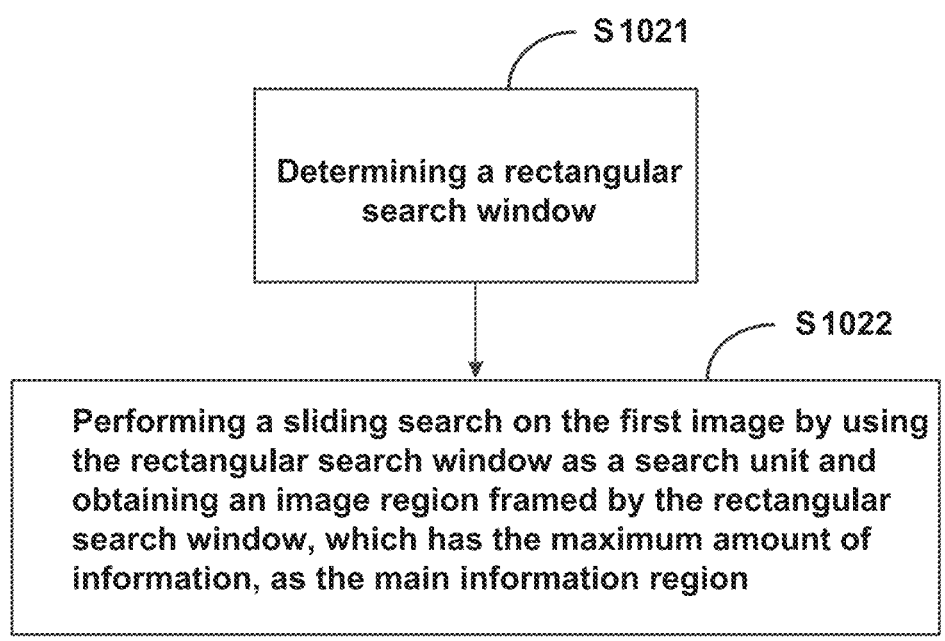
FIG. 2 shows a specific implementation of step S102 in the information processing method according to the first embodiment of the disclosure.

Referring to FIG. 2, step S102 may be specifically implemented by:

at S1021, determining a rectangular search window; and at S1022, performing a sliding search on the first image by using the rectangular search window as a search unit and obtaining an image region framed by the rectangular search window, which has the maximum amount of information, as the main information region.

Regarding step S1021, the rectangular search window has the same height as the source wallpaper image and the same width as the cellphone's screen. The aspect ratio of the rectangular search window may be the same as that of the screen. The search window may be of any other shape. The disclosure is not limited in this regard, and those skilled in the art may set the search window according to practical demands.

Step S1022 may be implemented in two manners.

First, step S1022 may be implemented by:

calculating a sum of edge strength values of all pixels within the rectangular search window to obtain a first calculation result;

determining an image region with the maximum first calculation result as the main information region, wherein the first calculation result characterizes an information amount of an image region framed by the rectangular search window.

In the case of the above example, the sliding search is performed by sliding a rectangular search window, which has the same height as the source wallpaper image and the same width as the cellphone screen, over an edge-detection processed wallpaper image. In the embodiment, the edge-detection processed wallpaper image is a binary image where black represents an edge region and white represents a background region. Therefore, the calculating the sum of edge strength values of all pixels within the search window is equivalent to counting black pixels in the search window. By searching through the wallpaper image using the rectangular search window, a region with the maximum sum of edge strength values is found as the main information region. That region contains the maximum number of edges, and is thus a region of the source wallpaper image where important structural information exists, that is, a region where the most important content of the source wallpaper image exists.

Second, step S1022 may be implemented by:

compressing the first image according to a predefined ratio to obtain a first compressed image;

searching the first compressed image to find an image region framed by the rectangular search window, which has the maximum amount of information, as the main information region.

Specifically, the source wallpaper image selected as the background image typically has a high resolution and a large size. Processing such an image requires a large amount of computation. In order to reduce the amount of computation, the source wallpaper image may be compressed in advance according to a predefined ratio to reduce the size of the source wallpaper image. The predefined ratio may take the same value as the aspect ratio of the source wallpaper image or may be set by those skilled in the art according to practical demands. The disclosure is not limited in this regard. By compressing the source wallpaper image and then processing the compressed image in the first manner, image processing is accelerated.

Step S103 may be implemented in two manners. However, its implementation is not limited to these two manners, and those skilled in the art may conceive of other manners according to practical demands.

First, step S103 may be implemented by:

judging whether a size of the background image of the graphical interactive interface is the same as that of a displaying unit of the electronic device to obtain a judgment result;

when the judgment result is affirmative, cutting from the first image the main information region as the second image.

Second, step S103 may be implemented by:

when the judgment result is negative and a first width of the background image of the graphical interactive interface is greater than a second width of the displaying unit, cutting from the first image the main information region and a second region as the second image, wherein the second region is a portion of the first image which is adjacent to the main information region.

Here, the second image can be divided into M sub-images. The M sub-images are respectively used as background images for M main screens corresponding to the graphical interactive interface, and one of the M sub-images which includes the main information region is used as a background image for a first main screen among the M main screens. M is an integer larger than or equal to 2.

In the case of the above example, there are typically two scenarios for setting a wallpaper image for a cellphone.

Figure 3:
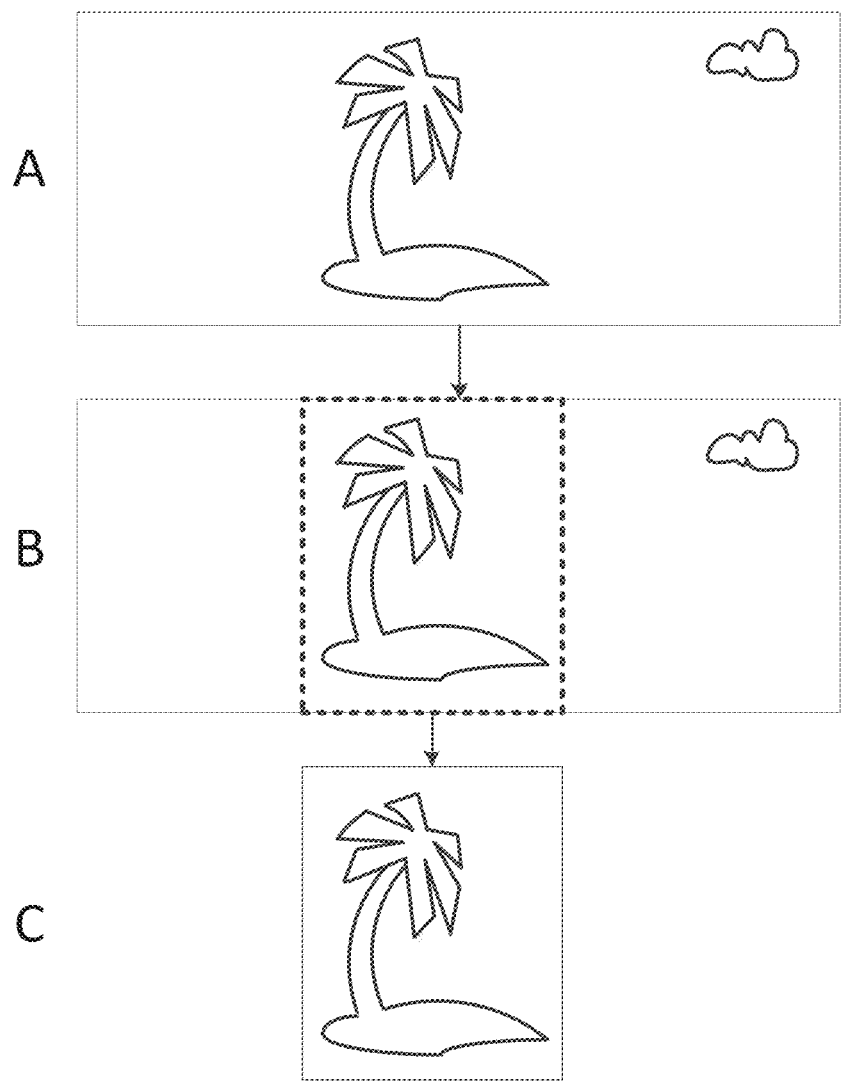
FIG. 3 shows a first scenario for setting a background image for a display interface according to the first embodiment of the disclosure.

In the first scenario, referring to FIG. 3, all display interfaces of the cellphone use the same background image, and switching among the displaying interfaces does not cause a change of the background image, that is, the size of the background image of the graphical interactive interface is the same as that of the displaying unit of the electronic device. In this scenario, a main information region of the source wallpaper image, which has the maximum amount of information, is determined by searching through the source wallpaper image using the rectangular search window. Then, the main information region is cut out according to the size of the display interface and used as the background image of the display interface.

To be specific, the main information region of the source wallpaper image includes a tree, as shown in part A of FIG. 3. By applying the above method, an image region framed by the search window, which has the maximum amount of information, is selected, as shown in part B of FIG. 3. The image region where the tree exists is cut out as the background image of the display interfaces, as shown in part C of FIG. 3.

Figure 4:
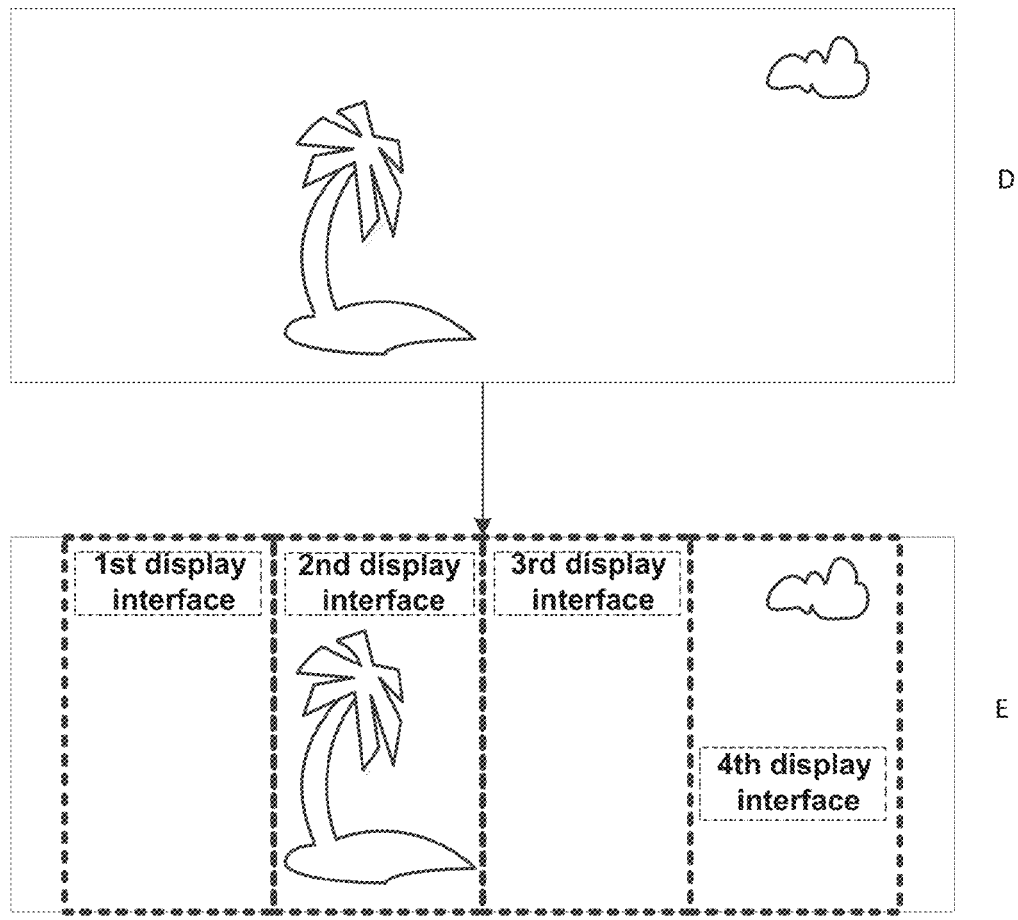
FIG. 4 shows a second scenario for setting a background image for a display interface according to the first embodiment of the disclosure.

In the second scenario, referring to FIG. 4, each of the display interfaces of the cellphone uses a different background image, and switching among the display interfaces would cause a change of the background image accordingly. Moreover, the background image of each display interface is a portion of the source wallpaper image, and switching among the display interfaces enables the entire source wallpaper image to be viewed. In this scenario, the source wallpaper image is searched using the rectangular search window, and a region with the maximum amount of information is selected as the main information region, which is cut out as the background image of the main display interface. Generally, when there are multiple display interfaces, one of them is the main display interface (i.e., the first main screen).

To be specific, the cellphone may have four display interfaces, including, from left to right, a first display interface, a second display interface, a third display interface and a fourth display interface. Among them, the second displaying screen is selected as the main display interface. The main information region of the source wallpaper image is still the image region that includes a tree, as shown in part D of FIG. 4. The image region where the tree exists is cut out as the background image of the second display interface (i.e. the first main screen), the region left-adjacent to the image region where the tree exists is cut out as the background image of the first display interface, the region right-adjacent to the image region where the tree exists is cut out as the background image of the third display interface, and the region right-adjacent to the background image of the third display interface is cut out the background image of the fourth display interface, as shown in part E of FIG. 4. The offset between background images of the display interfaces may be set based on the rectangular search window or the size of the source wallpaper image. The disclosure is not limited in this regard, and those skilled in the art may set the offset according to practical demands.

Too complicated content in the main information region of the source wallpaper image would affect the visibility of icons or controls on the display interface, making it difficult to see such icons or controls. Therefore, a threshold may be set to avoid using an image with too complicated content as a background image. Specifically, when a sum of edge strength values of all pixels within the rectangular search window is greater than the threshold, the corresponding image region is considered too complicated and hence not suitable to be used as a background image.

Second Embodiment

Figure 5:
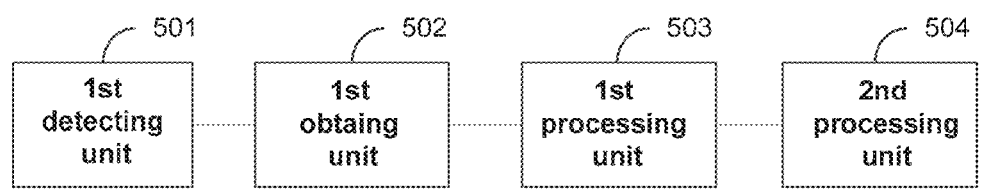
FIG. 5 is a block diagram illustrating a structure of an electronic device according to a second embodiment of the disclosure.

Based on the same concept as that of the information processing method according to the first embodiment, the second embodiment of the disclosure provides an electronic device. Referring to FIG. 5, the electronic device comprises:

a first detecting unit 501 configured to perform edge detection on the first image to obtain edge strength values for respective pixels of the first image;

a first obtaining unit 502 configured to determine, according to the edge strength values of the pixels, a main information region of the first image;

a first processing unit 503 configured to crop, according to the main information region, the first image to obtain a second image which includes the main information region;

a second processing unit 504 configured to set the second image as a background image for a graphical interactive interface of an electronic device, wherein the graphical interactive interface includes N controls, N being a positive integer.

The electronic device may further comprise:

a third processing unit configured to perform a compression process and/or a grayscaling process and/or a filtering and smoothing process on the first image, prior to performing the edge detection on the first image to obtain the edge strength values for the respective pixels of the first image.

In order to determine the main information region, the first obtaining unit 502 comprises:

a first obtaining sub-unit configured to determine a rectangular search window;

a second obtaining sub-unit configured to perform a sliding search on the first image by using the rectangular search window as a search unit and obtaining an image region framed by the rectangular search window, which has the maximum amount of information, as the main information region.

In order to determine the main information region by using the rectangular search window, the second obtaining sub-unit comprises:

a first processing module configured to calculate a sum of edge strength values of all pixels within the rectangular search window to obtain a first calculation result;

a first obtaining module configured to determine an image region with the maximum first calculation result as the main information region, wherein the first calculation result characterizes an information amount of an image region framed by the rectangular search window.

In order to reduce the amount of computation, the second obtaining sub-unit comprises:

a second processing module configured to compress the first image according to a predefined ratio to obtain a first compressed image;

a third obtaining module configured to search the first compressed image to find an image region framed by the rectangular search window, which has the maximum amount of information, as the main information region.

In order to determine a background image of a display interface, the first processing unit 503 comprises:

a first judging sub-unit configured to judge whether a size of the background image of the graphical interactive interface is the same as that of a displaying unit of the electronic device to obtain a judgment result;

a first processing sub-unit configured to cut from the first image the main information region as the second image, when the judgment result is affirmative.

In order to determine background images of multiple display interfaces, the first processing unit 503 comprises:

a second processing sub-unit configured to cut from the first image the main information region and a second region as the second image, when the judgment result is negative and a first width of the background image of the graphical interactive interface is greater than a second width of the displaying unit of the electronic device, wherein the second regional image is a portion of the first image which is adjacent to the main information region, wherein the first image can be divided into M sub-images, the M sub-images are respectively used as background images for M main screens corresponding to the graphical interactive interface, and one of the M sub-images which includes the main information region is used as a background image for a first main screen among the M main screens, M being an integer larger than or equal to 2.

Third Embodiment

Figure 6:
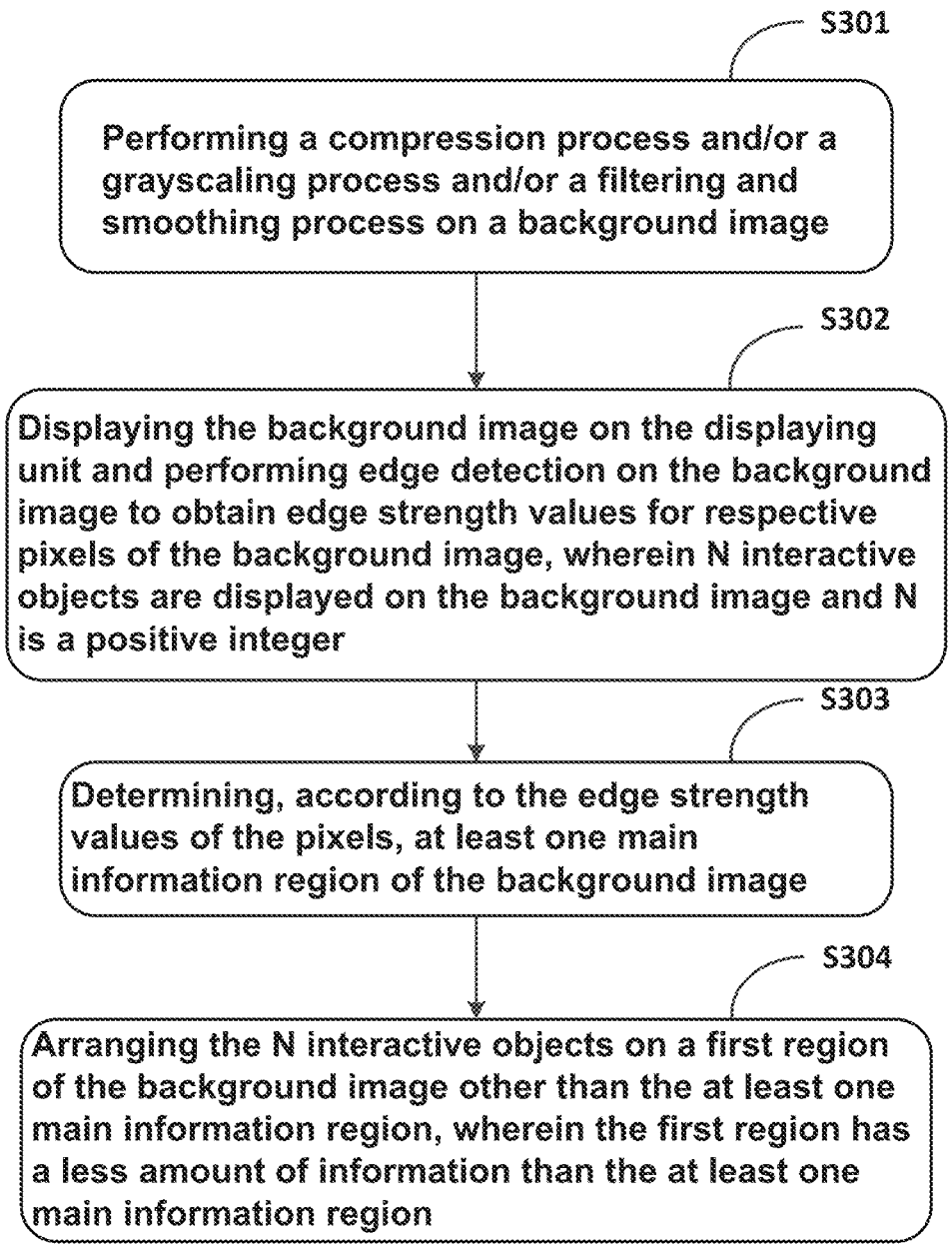
FIG. 6 shows a flowchart of an information processing method according to a third embodiment of the disclosure.

Referring to FIG. 6, this embodiment of the disclosure provides an information processing method applied to an electronic device that comprises a displaying unit. The method comprises:

at S301, performing a compression process and/or a grayscaling process and/or a filtering and smoothing process on a background image;

at S302, displaying the background image on the displaying unit, and performing edge detection on the background image to obtain edge strength values for respective pixels of the background image, wherein N interactive objects are displayed on the background image and N is a positive integer;

at S303, determining, according to the edge strength values of the pixels, at least one main information region of the background image;

at S304, arranging the N interactive objects on a first region of the background image other than the at least one main information region, wherein the first region has a less amount of information than the at least one main information region.

In detailed implementation, the electronic device may be a cellphone, a tablet computer, etc. Detailed description of how to implement the method according to the embodiment of the disclosure will be given by taking an example where the electronic device is the cellphone.

In detailed implementation, the background image of the cellphone may be set according to a user's preference as his preferred wallpaper image, including a photo stored in the cellphone (such as, a group photo with friends), a picture downloaded from Internet (such as a picture of a kid) or the like. Then, it is desirable that the application icons, when displayed on the background image, do not cover the main content of the background image, for example, the kid's body in the picture of the kid.

In the case of the above example where the electronic device is a cellphone, when the picture of the kid is set as the background image, in order to reduce the amount of computation, the step S301 is executed firstly, where a compression process and/or a grayscaling process and/or a filtering and smoothing process is performed on the background image.

Figure 7:
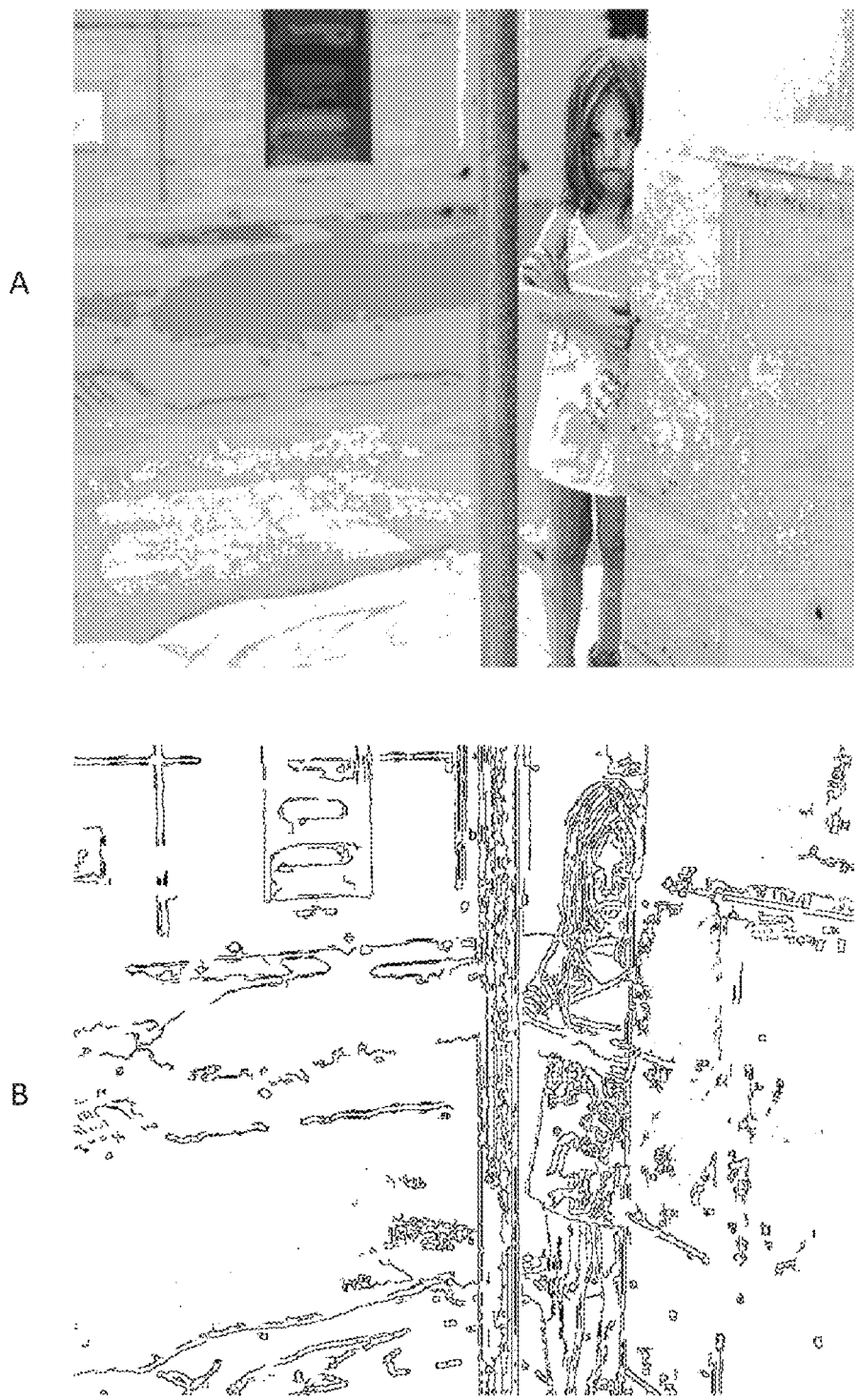
FIG. 7 shows an image obtained by performing filtering and edge detection processes on the background image according to the third embodiment of the disclosure.

In detailed implementation, pre-processing, such as a compression process, a grayscaling process and a filtering and smoothing process, is firstly performed on the picture of the kid, as shown in FIG. 7. The compression process may be implemented by performing down-sampling, local averaging and so forth. The grayscaling process may be implemented by binarizing the image so as to obtain a grayscale version of the background image. By performing the filtering and smoothing process on the grayscale image, noise in the background image may be removed so as to improve signal-to-noise ratio of the background image. To this end, various approaches such as Gaussian filtering, median-value filtering and the like may be applied, as long as they can effectively remove the noise. The disclosure is not limited in this regard, and those skilled in the art may select, according to practical demands, appropriate approaches to perform the compression process, grayscaling process and filtering and smoothing process on the background image.

After a pre-processed background image is obtained as described above, the method proceeds to step S302, where a background image is displayed on the displaying unit and edge detection is performed on the background image to obtain edge strength values for respective pixels of the background image. On the background image, N interactive objects are displayed. N is a positive integer.

Specifically, in this embodiment, important structural information of the background image may be determined by performing the edge detection. For example, if the background image has a red background with a yellow triangle overlaid thereon, then a boundary between the triangle and the background (i.e. the border of the triangle) may be obtained by performing edge detection on the image. By performing edge detection, each pixel of the image is provided with a corresponding edge strength value. If the edge strength values for two pixels are close, then it is considered that there is a small color discrepancy between these two pixels. If the edge strength values for two pixels differs a lot, then it is considered that there is a large color discrepancy between these two pixels, that is, a boundary exists therebetween. Thus, the edge strength value may be used as a parameter reflecting information contents of the image. Specifically, when the background image is the picture of the kid, there will be a large difference in edge strength value between the body of the kid and the background behind the kid. Thus, after the edge detection is performed on the background image, edges will be detected at the border of the body. In the embodiment, the edge strength value may be obtained by applying an edge detection operator to luminance values of pixels in the image. In the embodiment, the edge detection operator may be a Laplace edge filtering operator, a Sobel edge filtering operator, a Robert edge operator, a Prewitt edge operator, a LOG edge operator or a Canny filtering operator, etc. The disclosure is not limited in this regard, and those skilled in the art may also use other operators to perform edge detection.

After the execution of step S302, the method according to the embodiment proceeds to S303, where at least one main information region of the first image is determined according to the edge strength values of the pixels.

Figure 8:
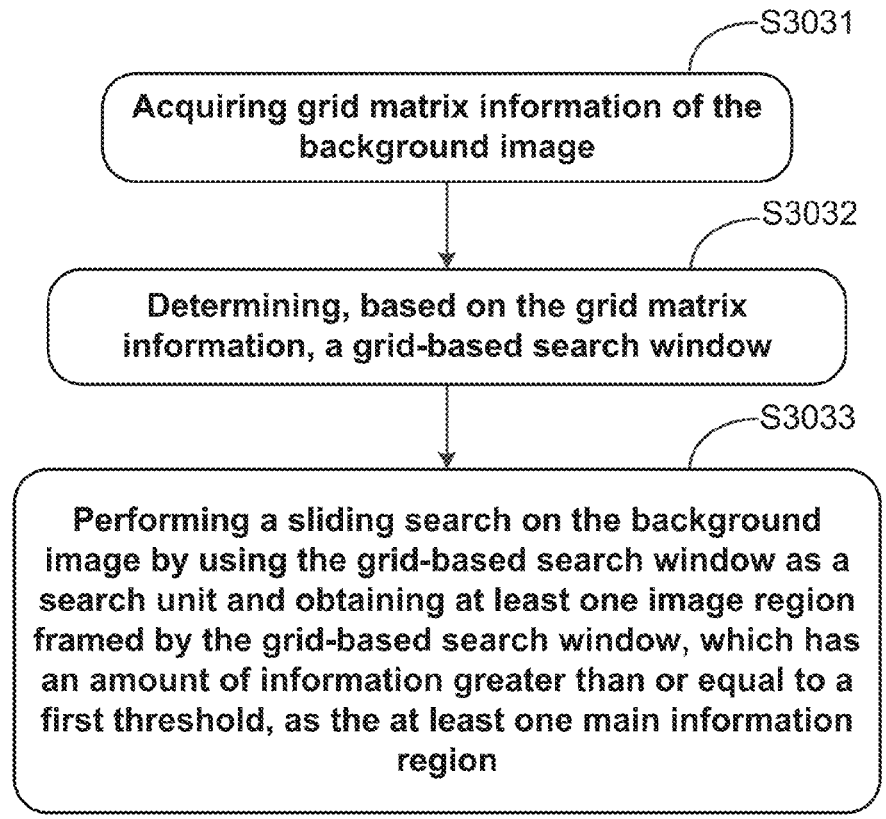
FIG. 8 shows a specific implementation of step S303 in the information processing method according to the third embodiment of the disclosure.

In the embodiment, referring to FIG. 8, Step S102 may be specifically implemented by:

at step S3031, acquiring grid matrix information of the background image;

at step S3032, determining, based on the grid matrix information, a grid-based search window;

at step S3033, performing a sliding search on the background image by using the grid-based search window as a search unit and obtaining at least one image region framed by the grid-based search window, which has an amount of information greater than or equal to a first threshold, as the at least one main information region.

Figure 9:
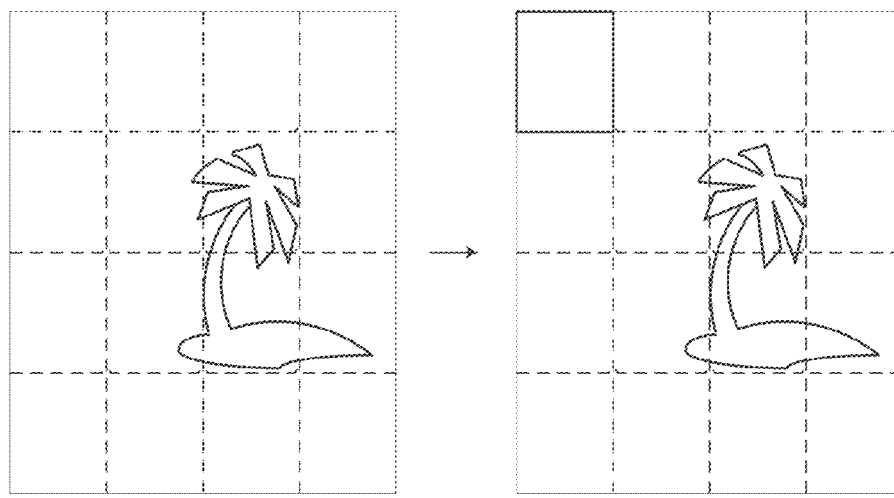
FIG. 9 shows a schematic diagram of grid information and a grid-based search window for the background image according to the third embodiment of the disclosure.

In detailed implementation, in the case of the above example where the electronic device is a cellphone, each background image displayed on the cellphone involves grid matrix information. For example, the grid matrix information for some cellphone is 4×4, which means 16 (=4×4) application icons may be displayed on the display interface of the cellphone, as shown in FIG. 9. Alternatively, the grid matrix information may be 5×5, which means 25 (=5×5) application icons may be displayed on the display interface of the cellphone. Thus, the display interface of the cellphone is divided into 16 (or 25) rectangular regions. When the central processor (such as CPU) of the cellphone detects that the grid matrix information of the cellphone is 4×4, a grid-based search window is obtained based on the size of any of the 16 rectangular regions.

In this embodiment, step S3033 may be implemented in two manners.

Figure 10:
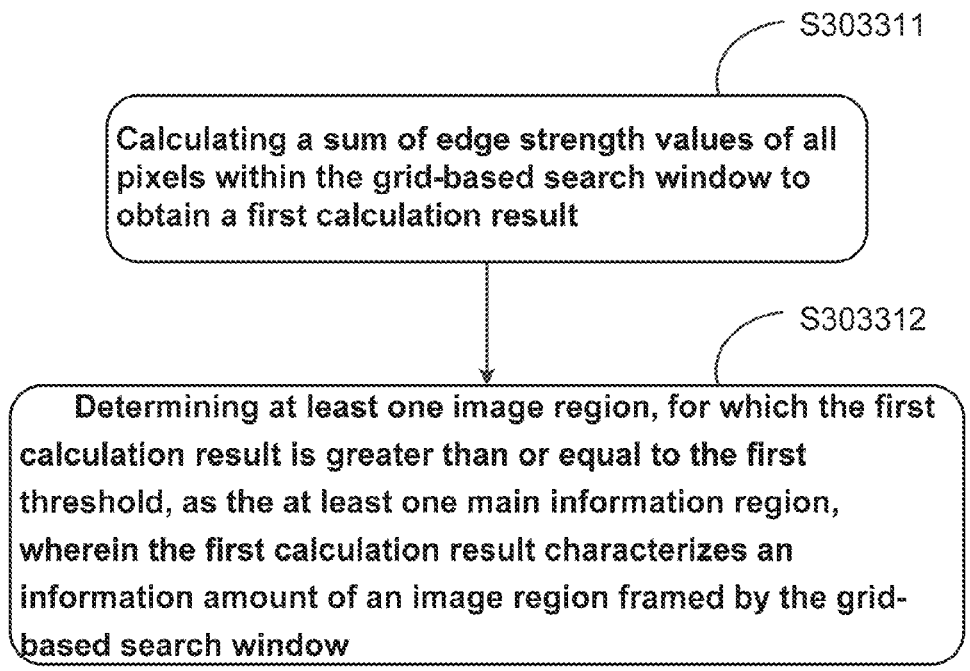
FIG. 10 shows a first implementation of step S3033 in the information processing method according to the third embodiment of the disclosure.

First, referring to FIG. 10, step S3033 may be implemented by:

at step S303311, calculating a sum of edge strength values of all pixels within the grid-based search window to obtain a first calculation result;

at step S303312, determining at least one image region, for which the first calculation result is greater than or equal to the first threshold, as the at least one main information region, wherein the first calculation result characterizes an information amount of an image region framed by the grid-based search window.

In detailed implementation, the sliding search is performed by sliding a grid-based search window corresponding to the grid matrix of the background image over an edge-detection processed background image. In the embodiment, the edge-detection processed background image is a binary image where black represents an edge region and white represents a background region. Therefore, the calculating the sum of edge strength values of all pixels within the grid-based search window is equivalent to counting black pixels in the search window. By searching through the background image using the grid-based search window, selecting an edge strength value as the threshold and comparing the sum of edge strength values calculated for the grid-based search window with the threshold, a region framed by the grid-based search window is detected as a main information region when the sum of edge strength values calculated for the grid-based search window is greater than or equal to the threshold. That region is a region of the background image where important structural information exists, that is, a region where the most important content of the background image exists.

Figure 11:
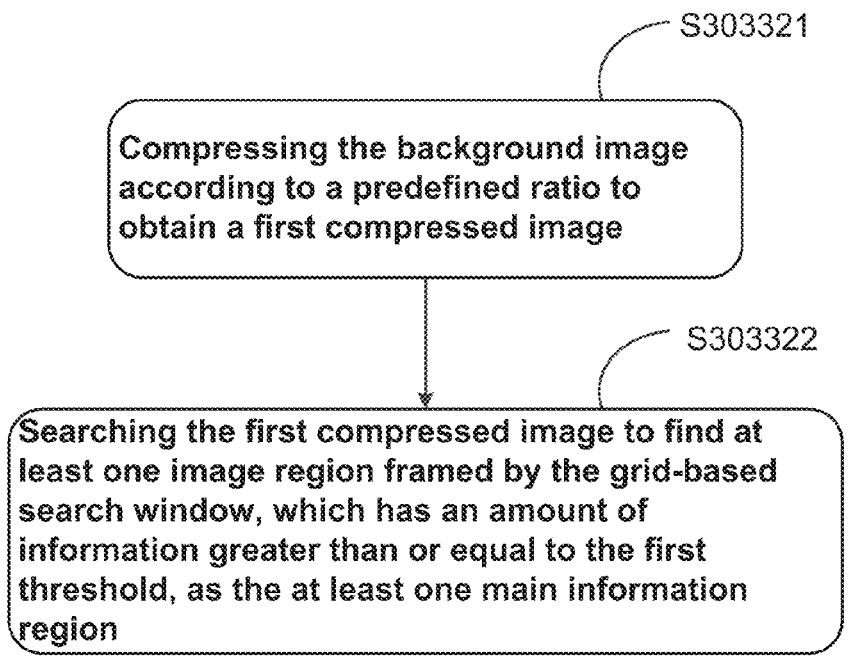
FIG. 11 shows a second implementation of step S3033 in the information processing method according to the third embodiment of the disclosure.

Second, referring to FIG. 11, step S3033 may be implemented by:

at step S303321, compressing the background image according to a predefined ratio to obtain a first compressed image;

at step S303321, searching the first compressed image to find at least one image region framed by the grid-based search window, which has an amount of information greater than or equal to the first threshold, as the at least one main information region.

In detailed implementation, the wallpaper selected as the background image typically has a high resolution and a large size. Processing such an image requires a large amount of computation. In order to reduce the amount of computation, the background image may be compressed in advance according to a predefined ratio to reduce the size of the background image. The predefined ratio may take the same value as the aspect ratio of the background image or may be set by those skilled in the art according to practical demands. The disclosure is not limited in this regard. By compressing the background image and then processing the compressed image in the first manner, image processing is accelerated.

In the case of the above example where the electronic device is a cellphone, the background image is a photo of a tree and its grid matrix is a 4×4 matrix. A grid of the background image is used as a search unit, and a sliding search is performed by sliding a grid-based search window over an edge-detection processed background image. By counting black pixels in respective grid regions, 16 count values are obtained. When the threshold is set as 30 black pixels, the 16 count values are respectively compared with 30. The grid regions with count values greater than 30 are determined as the main information regions. For example, the grid regions that contain respective portions of the tree are determined as the main information regions, as shown in FIG. 9.

In detailed implementation, when the selected photo of the tree has a high resolution, processing such a background image would require a large amount of computation in order to guarantee its displaying effect. For a cellphone with limited cache, this would slow down the cellphone and degrade user experience. In this circumstance, by compressing the photo of the tree (that is, the background image) using Huffman coding or the like, a compressed image is obtained which has the same aspect ratio as the original photo. Then, a grid of the background image is used as a search unit, black pixels in respective grid regions are counted, and the count values are compared with the threshold set as 30. The grid regions with count values greater than 30 are determined as the main information regions. For example, as shown in FIG. 9, the grid regions that contain respective portions of the tree are determined as the main information regions.

After the execution of step S303, the method according to the embodiment proceeds to S304, where the N interactive objects are arranged on a first region of the background image other than the at least one main information region, wherein the first region has a less amount of information than the at least one main information region.

Figure 12:
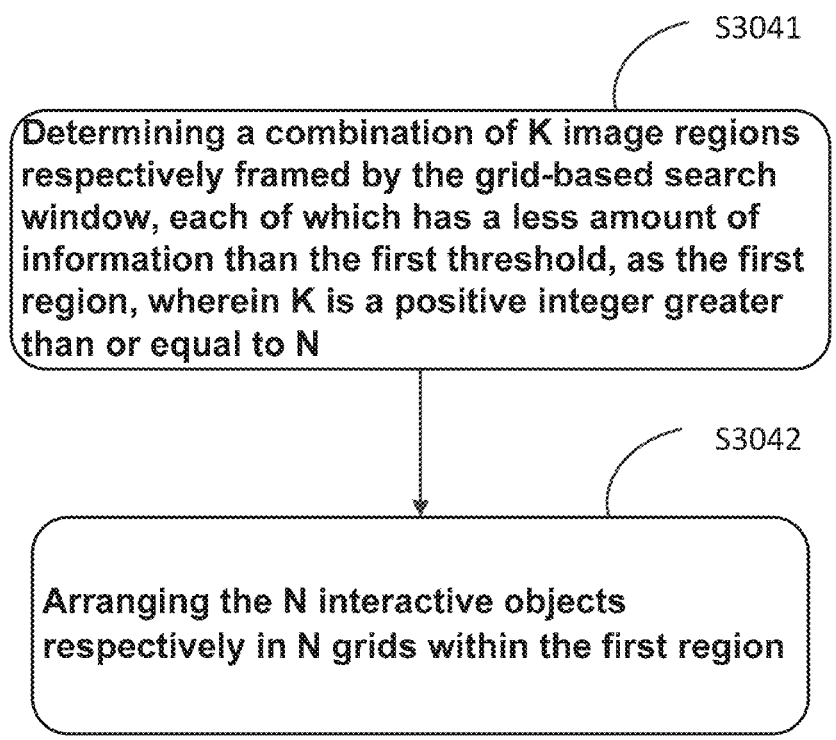
FIG. 12 shows a specific implementation of step S304 in the information processing method according to the third embodiment of the disclosure.

In the embodiment, referring to FIG. 12, step S304 may be specifically implemented by:

at step S3041, determining a combination of K image regions respectively framed by the grid-based search window, each of which has a less amount of information than the first threshold, as the first region, wherein K is a positive integer greater than or equal to N;

at step S3042, arranging the N interactive objects respectively in N grids within the first region.

Figure 13:
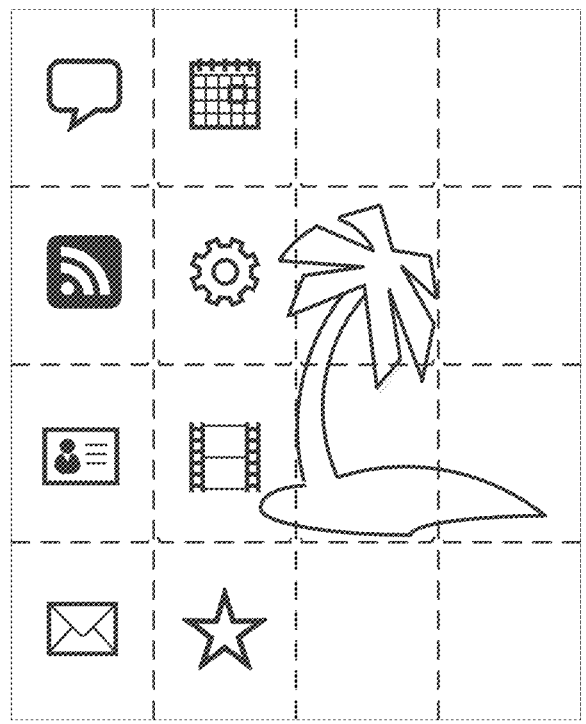
FIG. 13 is a schematic diagram illustrating an exemplary result of the specific implementation of step S304 in the information processing method according to the third embodiment of the disclosure.

In the case of the example as stated above, when it is determined that the three grid regions that contain respective portions of the tree are main information regions, application icons are not allowed to be arranged in the 3 grids. Thus, the other 13 grid regions are determined as the first region. In that case, when 10 application icons are to be arranged on the background image, any 10 of the 13 grid regions may be selected to hold these 10 application icons, as shown in FIG. 13. In detailed implementation, the icons may be arranged line by line or column by column. The disclosure is not limited in this regard, and those skilled in the art may also adopt other approaches for automatically arranging the icons.

Fourth Embodiment

Figure 14:
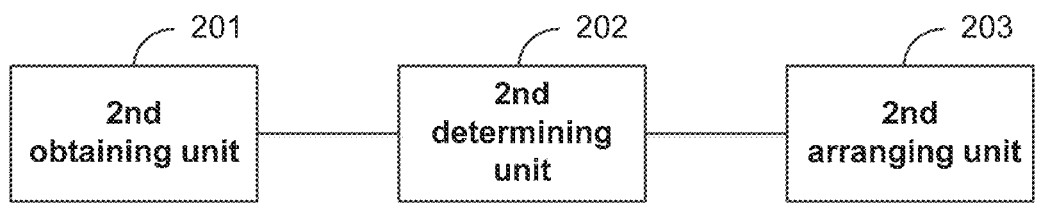
FIG. 14 is a block diagram illustrating a structure of an electronic device according to a fourth embodiment of the disclosure.

Based on the same concept as that of the information processing method according to the third embodiment, the fourth embodiment of the disclosure provides an electronic device comprising a displaying unit. Referring to FIG. 14, the electronic device comprises:

a second obtaining unit 201 configured to performing edge detection on a background image displayed on the displaying unit to obtain edge strength values for respective pixels of the background image, wherein N interactive objects are displayed on the background image and N is a positive integer;

a second determining unit 202 configured to determine, according to the edge strength values of the pixels, at least one main information region of the background image;

a second arranging unit 203 configured to arrange the N interactive objects on a first region of the background image other than the at least one main information region, wherein the first region has a less amount of information than the at least one main information region.

The electronic device further comprises:

a first processing unit configured to perform a compression process and/or a grayscaling process and/or a filtering and smoothing process on the background image.

In order to determine the at least one main information region, the second obtaining unit 202 comprises:

a first obtaining sub-unit configured to acquire grid matrix information of the background image;

a second obtaining sub-unit configured to determine, based on the grid matrix information, a grid-based search window;

a third obtaining sub-unit configured to perform a sliding search on the background image by using the grid-based search window as a search unit and obtaining at least one image region framed by the grid-based search window, which has an amount of information greater than or equal to a first threshold, as the at least one main information region.

In order to determine the at least one main information region by using the grid-based search window, the third obtaining sub-unit comprises:

a first processing module configured to calculate a sum of edge strength values of all pixels within the grid-based search window to obtain a first calculation result;

a first determining module configured to determine at least one image region, for which the first calculation result is greater than or equal to the first threshold, as the at least one main information region, wherein the first calculation result characterizes an information amount of an image region framed by the grid-based search window.

In order to reduce the amount of computation, the third obtaining sub-unit comprises:

a second processing module configured to compress the background image according to a predefined ratio to obtain a first compressed image;

a second determining module configured to search the first compressed image to find at least one image region framed by the grid-based search window, which has an amount of information greater than or equal to the first threshold, as the at least one main information region.

In order to arrange the N interactive objects on a region of the background image other than the at least one main information region, the second arranging unit 203 comprises:

a first determining sub-unit configured to determine a combination of K image regions respectively framed by the grid-based search window, each of which has a less amount of information than the first threshold, as the first region, wherein K is a positive integer greater than or equal to N;

a first arranging sub-unit configured to arrange the N interactive objects respectively in N grids within the first region.

In one of the examples described above, an image region with the maximum amount of information is selected as the main screen background image for the electronic device's main display interface by detecting an information distribution on the source wallpaper image. Then, background images for other display interfaces may be determined based on the position information of the main screen background image. As such, the background images may be cut out based on the information contents of the source wallpaper image.

In one of the examples described above, an image region with the maximum amount of information is determined by: processing the source wallpaper image by applying compression, grayscaling, and filtering and smoothing processes; performing edge detection on the processed image; searching through the edge-detection processed image by using a rectangular search window; and calculating a sum of the edge strength values of all pixels within the rectangular search window. By compressing the source wallpaper image, the amount of computation is reduced. That is, an image region with the maximum amount of information may be accurately determined at reduced computational cost.

In one of the examples described above, sizes of the graphical interactive interface and the background image are detected. For a background image applied to only one display interface, a region of the source wallpaper image with the maximum amount of information is selected as the background image. For background images applied to multiple displaying interfaces respectively, a region of the source wallpaper image with the maximum amount of information is selected as the background image for the main display interface, and image regions adjacent to the background image for the main display interface may be used as the background images for other display interfaces. That is, background images may be reasonably assigned according to the information contents of the source wallpaper image.

In one of the examples described above, an image region with the maximum amount of information is selected as the main screen background image for the electronic device's display interface by detecting an information distribution on the source wallpaper image. That is, image contents that best describe the subject of the source wallpaper background are selected as the main screen background image. As such, the subject of the source wallpaper background is accurately presented, and user experience is improved accordingly.

In one of the examples described above, regions with large amounts of information are selected by detecting an information distribution on the background image. Then, based on the grid information of the display interface, application icons are arranged on regions other than those with large amounts of information. As such, application icons may be arranged based on the information contents of the background image.

In one of the examples described above, an image region with an amount of information greater than a threshold may be determined by: determining a grid-based search window according to grid information of the display interface; processing the background image by applying compression, grayscaling, and filtering and smoothing processes; performing edge detection on the processed image; searching through the edge-detection processed image by using the grid-based search window; and calculating a sum of the edge strength values of all pixels within the grid-based search window. By compressing the background image, the amount of computation is reduced. That is, an image region of the background image with an amount of information greater than a threshold may be accurately determined with reduced computational cost.

In one of the examples described above, image regions with large amounts of information may be determined by detecting an information distribution on the background image. Icons are arranged outside such regions with large amounts of information, to expose contents that best describe the subject of the background image, that is, to prevent them from being covered by the icons. As such, it is possible to accurately present the subject of the source wallpaper background without having to manually arrange the icons. Accordingly, user experience is improved.

Those skilled in the art should appreciate that the embodiments in the disclosure may be provided as methods, systems or computer program products. Therefore, the disclosure may be implemented by hardware, software or any combination of hardware and software. Moreover, the disclosure may employ a form of a computer program product, which may be implemented on one or more computer readable storage medium (including, but not limited to, disk memories, CD-ROM, optical memories and the like) that contains computer executable program codes thereon.

The disclosure is described with respect to flow diagrams or block diagrams of methods, devices (systems) and computer program products according to the embodiments of the disclosure. It should be appreciated that each flow and/or block of the flowcharts and/or block diagrams or any combination thereof may be implemented with computer program instructions. Such computer program instructions may be provide to a general-purpose computer, a special-purpose computer, an embedded processor or some other programmable data processing device, so that they can be executed by the computer or the programmable data processing device to create means for implementing functions specified in one or more flows of the flowcharts and/or one or more blocks of the block diagrams.

These compute program instructions may also be stored on a computer readable storage that can direct a computer or some other programmable data processing device to operate in a particular manner. The instructions stored on the computer readable storage may create an article of manufacture, which comprises instruction means for implementing functions specified in one or more flows of the flowcharts and/or one or more blocks of the block diagrams.

These computer program instructions may also be loaded onto a computer or some other programmable data processing device. The instructions cause the computer or the programmable data processing device to execute a series of operations, so as to generate computer-implemented processes. As such, the instructions executed on the computer or the programmable data processing device are used to implement steps of functions specified in one or more flows of the flowcharts and/or one or more blocks of the block diagrams.

In particular, computer program instructions corresponding to an information processing method according to an embodiment of the disclosure may be stored on an optical disk, a hard disk, a flash disk or some other storage medium. When the computer program instructions in the storage medium which correspond to the information processing method are read or executed by an electronic device, the following steps are performed:

displaying a first image;

performing edge detection on the first image to obtain edge strength values for respective pixels of the first image;

determining, according to the edge strength values of the pixels, at least one main information region of the first image;

performing an operation on the first image according to the main information region.

Although preferred embodiments of the disclosure have been described, those skilled in the art may make various changes or modifications to these embodiments once they have learned the basic inventive concepts of the disclosure. Therefore, the appended claims are intended to be interpreted as including the preferred embodiments and all the changes and modifications that fall within the scope of the disclosure.

Apparently, various amendments and variations may be made by those skilled in the art to the disclosure without departing the spirit and scope of the disclosure. Therefore, the disclosure is intended to include these amendments and variations, as long as they fall within the scope of the claims and equivalents thereof.

What is claimed is:

1. An information processing method, comprising:
    displaying a first image;
    performing edge detection on the first image to obtain edge strength values for respective pixels of the first image;
    determining, according to the edge strength values of the pixels, at least one main information region of the first image; and
    performing an operation on the first image according to the main information region,
    wherein the determining step comprises:
        acquiring grid matrix information of the first image;
        determining, based on the grid matrix information, a grid-based search window; and
        obtaining at least one region of the first image, which has an amount of information greater than a first threshold, as the at least one main information region, by searching through the first image using the grid-based search window.

2. The method according to claim 1, further comprising:
    prior to performing the edge detection on the first image to obtain the edge strength values for the respective pixels of the first image; and
    performing on the first image at least one of a compression process, a grayscaling process and a filtering and smoothing process.

3. The method according to claim 1, wherein the operation comprises:
    determining, according to the at least one main information region, a position on the first image for displaying an interactive object at the position.

4. The method according to claim 1, wherein the obtaining at least one
    region of the first image, which has an amount of information greater than the first threshold, as the at least one main information region comprises:
    calculating a sum of edge strength values of pixels within the grid-based search window to
    obtain a first calculation result, which characterizes an information amount of an image region framed by the grid-based search window; and
    determining at least one image region, for which the first calculation result is greater than the first threshold, as the at least one main information region.

5. The method according to claim 1, wherein the obtaining at least one
    region of the first image, which has an amount of information greater than the first threshold, as the at least one main information region comprises:
    calculating a sum of edge strength values of pixels within the grid-based search window to
    obtain a first calculation result, which characterizes an information amount of an image region framed by the grid-based search window; and
    determining an image region with the maximum first calculation result as the main information region.

6. The method according to claim 1, wherein the performing an operation on the first image according to the at least one main information region comprises:
    cropping, according to the main information region, the first image to obtain a second image, which includes the main information region; and
    setting the second image as a background image for a graphical interactive interface of an electronic device, and displaying an interactive object on the at least one main information region.

7. The method according to claim 6, wherein the cropping, according to the main information region, the first image to obtain the second image comprises:
    dividing the first image into M sub-images, wherein the M sub-images are respectively used as background images for M screens corresponding to the graphic interactive interface, and one of the M sub-images which includes the main information region is used as a background image for a first screen among the M screens, wherein M is an integer larger than or equal to 2.

8. The method according to claim 1, wherein the performing an operation on the first image according to the at least one main information region comprises:
    displaying an interactive object on a region of the first image other than the at least one main information region, wherein the region of the first image other than the at least one main information region has a less amount of information than the at least one main information region.

9. An electronic device, comprising:
    a displaying unit configured to display an image;
    a detecting unit configured to perform edge detection on a first image displayed on the displaying unit to obtain edge strength values for respective pixels of the first image;
    a processing unit configured to determine, according to the edge strength values of the pixels; at least one main information region of the first image; and
    an operation performing unit configured to perform an operation on the first image according to the main information region,
    wherein, in order to determine the at least one main information region of the first image, the processing unit is configured to:
        acquire grid matrix information of the first image;
        determine, based on the grid matrix information, a grid-based search window; and
        obtain at least one region of the first image, which has an amount of information greater than a first threshold, as the at least one main information region, by searching through the first image using the grid-based search window.

10. The electronic device according to claim 9, wherein the processing unit is further configured to, prior to performing edge detection on the first image to obtain the edge strength values for the respective pixels in the first image, perform on the first image at least one of a compression process, a grayscaling process and a filtering and smoothing process.

11. The electronic device according to claim 9, wherein the operation comprises:
    determining, according to the at least one main information region, a position on the first image for displaying an interactive object at the position.

12. The electronic device according to claim 9, wherein the processing unit is further configured to:
    calculate a sum of edge strength values of pixels within the grid-based search window to obtain a first calculation result, which characterizes an information amount of an image region framed by the grid-based search window; and determine at least one image region, for which the first calculation result is greater than the first threshold, as the at least one main information region.

13. The electronic device according to claim 9, wherein the processing unit is further configured to:

calculate a sum of edge strength values of pixels within the grid-based search window to obtain a first calculation result, which characterizes an information amount of an image region framed by the grid-based search window; and determine an image region with the maximum first calculation result as the main information region.

14. The electronic device according to claim 9, wherein the operation performing unit is further configured to:

crop, according to the main information region, the first image to obtain a second image, which includes the main information region; and set the second image as a background image for a graphical interactive interface of an electronic device, and display an interactive object on the at least one main information region.

15. The electronic device according to claim 14, wherein the operation performing unit is further configured to:

divide the first image into M sub-images, wherein the M sub-images are respectively used as background images for M screens corresponding to the graphical interactive interface, and one of the M sub-images which includes the main information region is used as a background image for a first screen among the M screens, wherein M is an integer larger than or equal to 2.

16. The electronic device according to claim 9, wherein the operation performing unit is further configured to:

display an interactive object on a region of the first image other than the at least one main information region, wherein the region of the first image other than the at least one main information region has a less amount of information than the at least one main information region.

* * * * *